United States Patent
Sakai et al.

(10) Patent No.: US 10,659,728 B2
(45) Date of Patent: May 19, 2020

(54) INFORMATION PROCESSING APPARATUS AND INFORMATION PROCESSING METHOD

(71) Applicant: SONY CORPORATION, Tokyo (JP)

(72) Inventors: Yusuke Sakai, Kanagawa (JP); Daisuke Miki, Tokyo (JP); Atsushi Izumihara, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/099,812

(22) PCT Filed: Feb. 8, 2017

(86) PCT No.: PCT/JP2017/004476
§ 371 (c)(1),
(2) Date: Nov. 8, 2018

(87) PCT Pub. No.: WO2017/199483
PCT Pub. Date: Nov. 23, 2017

(65) Prior Publication Data
US 2019/0110023 A1 Apr. 11, 2019

(30) Foreign Application Priority Data
May 18, 2016 (JP) ................. 2016-099565

(51) Int. Cl.
H04N 7/14 (2006.01)
H04N 7/15 (2006.01)
G06T 1/00 (2006.01)
H04M 3/56 (2006.01)
G06T 7/70 (2017.01)
G06F 3/01 (2006.01)
H04N 5/262 (2006.01)
(Continued)

(52) U.S. Cl.
CPC ............. *H04N 7/147* (2013.01); *G06F 3/013* (2013.01); *G06T 1/00* (2013.01); *G06T 7/70* (2017.01);
(Continued)

(58) Field of Classification Search
CPC ........ H04N 7/147; H04N 5/2628; H04N 7/15; H04N 5/445; G06F 3/013; H04M 3/56;
(Continued)

(56) References Cited

U.S. PATENT DOCUMENTS 8,514,262 B2\* 8/2013 Ueno ................. G06K 9/00208
348/14.01
8,581,956 B2\* 11/2013 Robinson ................. H04N 7/15
348/14.06
(Continued)

FOREIGN PATENT DOCUMENTS

JP 06-245209 A 9/1994
JP 08-163416 A 6/1996
(Continued)

OTHER PUBLICATIONS

International Search Report and Written Opinion of PCT Application No. PCT/JP2017/004476 dated Apr. 4, 2017, 9 pages of ISRWO.

*Primary Examiner* — Stella L. Woo
(74) *Attorney, Agent, or Firm* — Chip Law Group

(57) ABSTRACT

Provided is an information processing apparatus including a receiving section that receives a captured image of a video communication partner from a communication destination apparatus and a control section that controls a display of the received captured image on a display section. The control section executes image processing to display the captured image such that a line of sight of a communication partner appearing in the captured image appears to point towards a user looking at the display section, on a basis of information indicating that the communication partner appearing in the captured image is looking at the user being displayed on the communication destination apparatus.

15 Claims, 14 Drawing Sheets

(51) Int. Cl.
  *G06K 9/00* (2006.01)
  *H04N 5/445* (2011.01)
(52) U.S. Cl.
  CPC ............ *H04M 3/56* (2013.01); *H04N 5/2628* (2013.01); *H04N 7/15* (2013.01); *G06K 9/00597* (2013.01); *G06T 2207/10016* (2013.01); *G06T 2207/30201* (2013.01); *H04N 5/445* (2013.01)
(58) Field of Classification Search
  CPC ...... G06K 9/00597; G06T 2207/10016; G06T 2207/30201; G06T 7/70; G06T 1/00
  See application file for complete search history.

(56) References Cited

U.S. PATENT DOCUMENTS

| | | | |
|---|---|---|---|
| 9,041,766 B1 * | 5/2015 | Gates | H04N 7/15 348/14.08 |
| 9,300,916 B1 * | 3/2016 | Breedvelt-Schouten | G06F 3/017 |
| 9,407,871 B2 * | 8/2016 | Lee | G06F 3/013 |
| 10,067,562 B2 * | 9/2018 | Teshome | G06F 3/013 |
| 2010/0315482 A1 * | 12/2010 | Rosenfeld | H04N 7/147 348/14.08 |
| 2011/0267422 A1 * | 11/2011 | Garcia | H04N 7/15 348/14.16 |
| 2012/0092436 A1 * | 4/2012 | Pahud | G06Q 10/10 348/14.02 |
| 2013/0070046 A1 * | 3/2013 | Wolf | H04N 7/144 348/14.16 |
| 2013/0120522 A1 * | 5/2013 | Lian | H04N 7/15 348/14.08 |

FOREIGN PATENT DOCUMENTS

| | | |
|---|---|---|
| JP | 2001-136501 A | 5/2001 |
| JP | 2010-239583 A | 10/2010 |
| JP | 2011-097447 A | 5/2011 |
| JP | 2012-070081 A | 4/2012 |
| JP | 2015-142168 A | 8/2015 |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/004476 filed on Feb. 8, 2017, which claims priority benefit of Japanese Patent Application No. JP 2016-099565 filed in the Japan Patent Office on May 18, 2016. Each of the above-referenced applications is hereby incorporated herein by reference in its entirety.

TECHNICAL FIELD

The present disclosure relates to an information processing apparatus, an information processing method, and a program.

BACKGROUND ART

Due to recent developments in communication technology, videoconferencing systems that connect remote locations by video and audio have been proposed. Specifically, for example, a display apparatus, a camera, a microphone, and a speaker are provided in each location, whereby video and audio acquired at one location are transmitted to the other location in real time, and output from the display apparatus and the speaker.

In a face-to-face conversation such as videoconferencing, if the lines of sight of the viewer and the partner on the display screen are not aligned, a sense of presence and the like is lost, and the efficiency of the conference or the like falls. For this reason, display apparatus with integrated cameras that achieve line-of-sight alignment have been variously proposed. For example, Patent Literature 1 below describes a videoconferencing system with line-of-sight alignment that installs a camera behind the screen using a half-mirror or the like. Also, Patent Literature 2 below describes a method of securing a camera in the center of a display screen.

CITATION LIST

Patent Literature

Patent Literature 1: JP H6-245209A
Patent Literature 2: JP H8-163416A

DISCLOSURE OF INVENTION

Technical Problem

However, with the technology described in Patent Literature 1 above, there is a problem with the configuration in that the system as a whole becomes bulky. Also, with the technology described in Patent Literature 2 above, there is a flaw in that the camera overlaps the screen.

Accordingly, the present disclosure proposes an information processing apparatus, an information processing method, and a program making it possible to grasp the partner's line of sight more naturally in video communication that connects remote locations.

Solution to Problem

According to the present disclosure, there is proposed an information processing apparatus including: a receiving section that receives a captured image of a video communication partner from a communication destination apparatus; and a control section that controls a display of the received captured image on a display section. The control section executes image processing to display the captured image such that a line of sight of a communication partner appearing in the captured image appears to point towards a user looking at the display section, on a basis of information indicating that the communication partner appearing in the captured image is looking at the user being displayed on the communication destination apparatus.

According to the present disclosure, there is proposed an information processing method, executed by a processor, including: receiving a captured image of a video communication partner from a communication destination apparatus; controlling a display of the received captured image on a display section; and executing image processing to display the captured image such that a line of sight of a communication partner appearing in the captured image appears to point towards a user looking at the display section, on a basis of information indicating that the communication partner appearing in the captured image is looking at the user being displayed on the communication destination apparatus.

According to the present disclosure, there is proposed a program causing a computer to function as: a receiving section that receives a captured image of a video communication partner from a communication destination apparatus; and a control section that controls a display of the received captured image on a display section. The control section executes image processing to display the captured image such that a line of sight of a communication partner appearing in the captured image appears to point towards a user looking at the display section, on a basis of information indicating that the communication partner appearing in the captured image is looking at the user being displayed on the communication destination apparatus.

Advantageous Effects of Invention

According to the present disclosure as described above, it becomes possible to grasp the partner's line of sight more naturally in video communication that connects remote locations.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
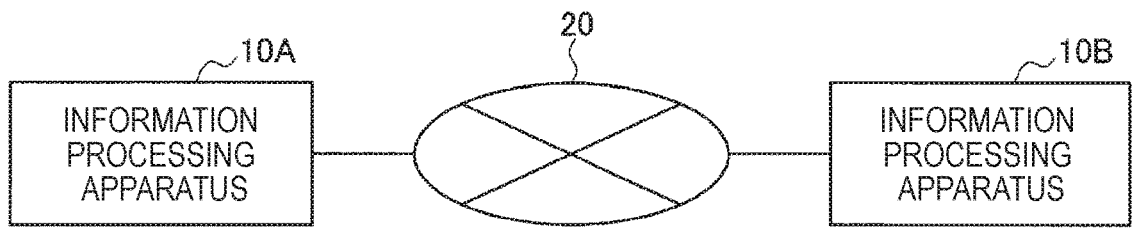
FIG. 1 is a diagram summarizing an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description will proceed in the following order.

1. Overview of information processing system according to embodiment of present disclosure
2. Configuration of information processing apparatus
3. Operating processes
4. Another embodiment
4-1. Overview
4-2. Operating processes
4-3. Screen display examples
5. Conclusion 1. Overview of Information Processing System According to Embodiment of Present Disclosure An overview of an information processing system 1 according to an embodiment of the present disclosure will be described with reference to FIG. 1. The information processing system 1 according to the present embodiment achieves video communication that connects remote locations by having information processing apparatus 10A and 10B in remote locations connect through a network 20, and transmit and receive video and audio, and in addition, shared content and the like.

Figure 2:
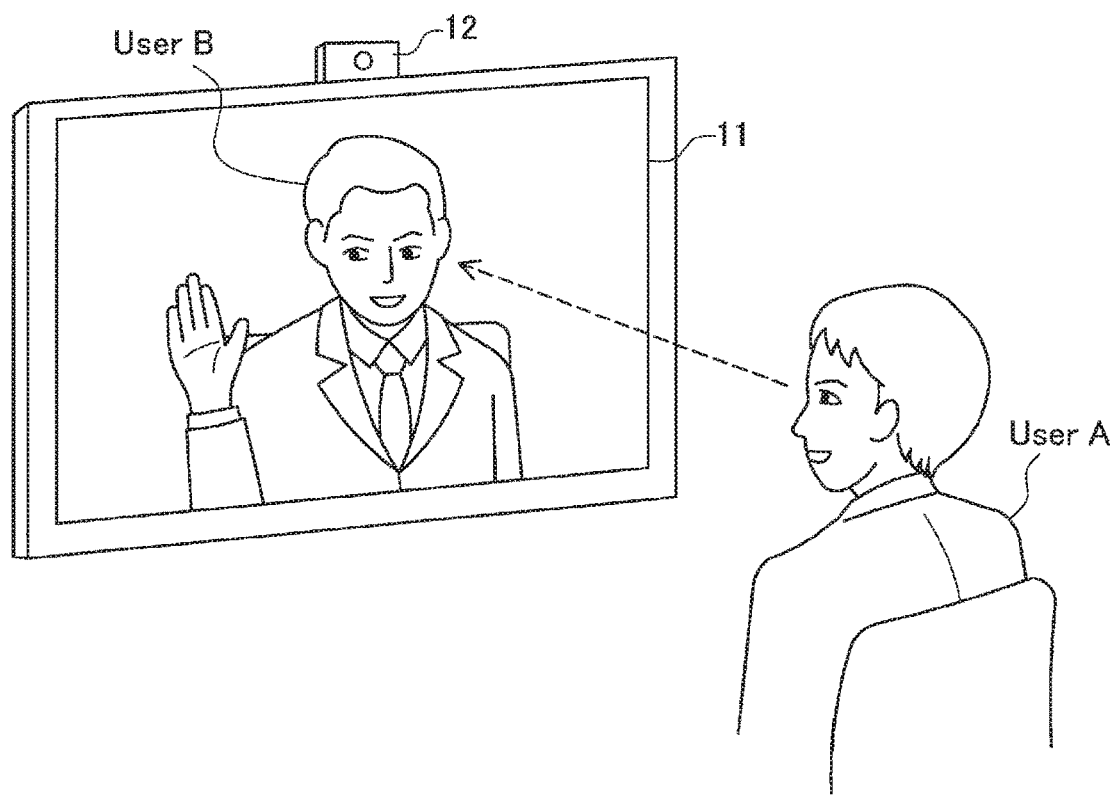
FIG. 2 is a diagram explaining line-of-sight misalignment in video communication that connects remote locations.

Herein, as illustrated in FIG. 2, video of each remote location is captured by a camera 12, but due to the influence of positional misalignment or the like between the camera 12 and a display 11, a problem arises in which the users' lines of sight become misaligned even though the users are looking at each other appearing on the displays. The user B appearing on the display 11 of FIG. 2 actually is looking at the user A, but because of positional misalignment between the display and the camera on user B's side, the user B's line of sight appears to be looking away from the user A. Also, the user A is looking at the user B appearing on the display 11, but because of positional misalignment between the display 11 and the camera 12, the user A's line of sight appears to be looking away from the user B.

Accordingly, an information processing system according to the present embodiment makes it possible to grasp the partner's line of sight more naturally in video communication that connects remote locations. Specifically, user line-of-sight detection is performed on each information processing apparatus 10, it is determined whether or not the user is looking at the partner user, and the results of such determinations are synchronized between each information processing apparatus 10. Additionally, in the case in which the partner user displayed on the display is looking at the user, each information processing apparatus 10 executes image processing such that the partner user's line of sight appears to point towards the user. With this arrangement, natural communication like the line-of-sight alignment in the same space can be achieved in remote communication.

2. Configuration of Information Processing Apparatus

Figure 3:
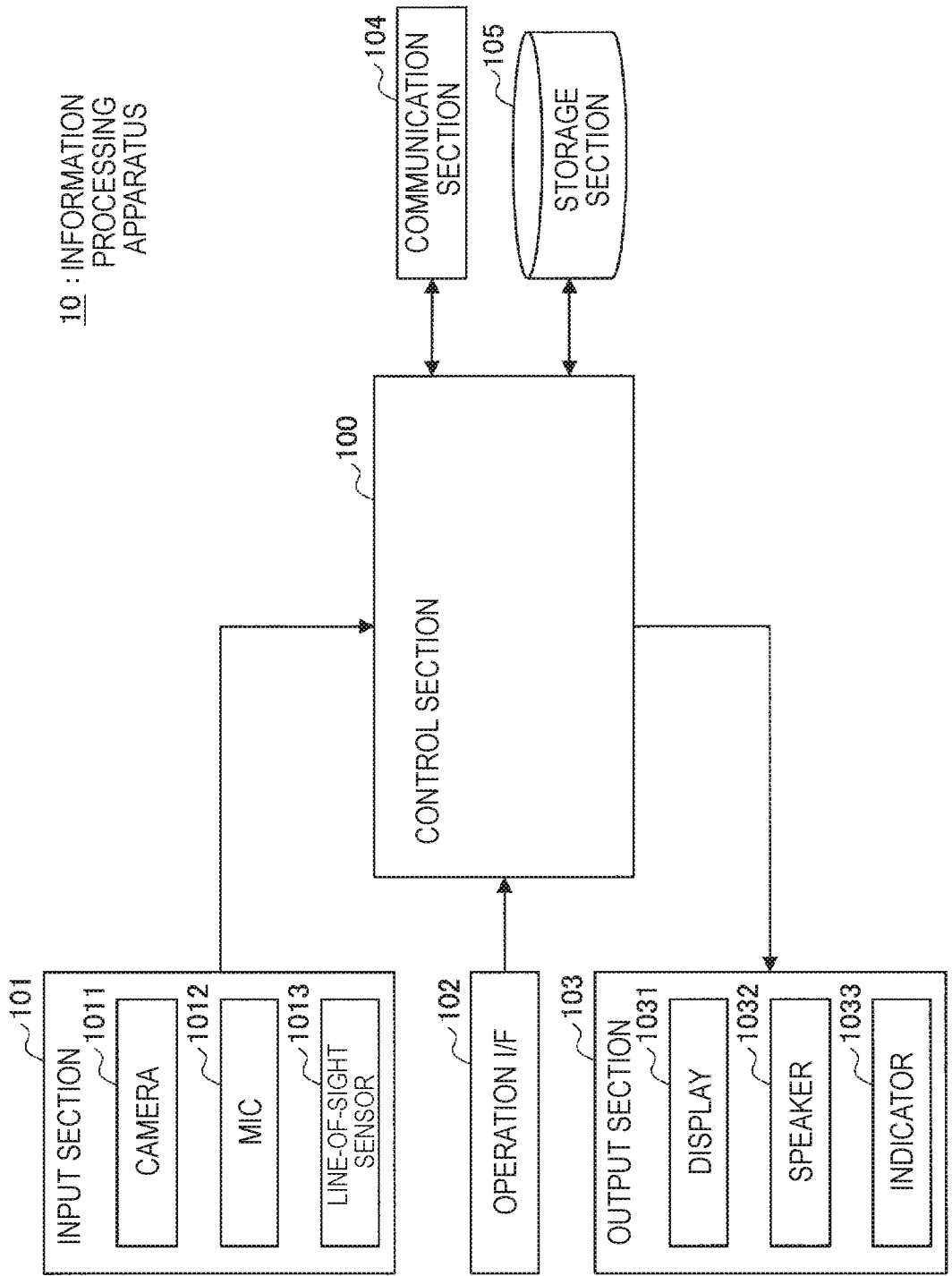
FIG. 3 is a block diagram illustrating an example of a configuration of an information processing apparatus according to the present embodiment.

Next, the configuration of the information processing apparatus 10 according to the present embodiment will be described with reference to FIG. 3. FIG. 3 is a block diagram illustrating an example of the configuration of the information processing apparatus 10 according to the present embodiment. As illustrated in FIG. 3, the information processing apparatus 10 includes a control section 100, an input section 101, an operation interface (I/F) 102, an output section 103, a communication section 104, and a storage section 105.

The control section 100 functions as a computational processing apparatus and control apparatus, and controls overall operation inside the information processing apparatus 10 by following various programs. The control section 100 is realized by an electronic circuit such as a central processing unit (CPU) or a microprocessor, for example. In addition, the control section 100 may also include read-only memory (ROM) that stores information such as programs to use and computational parameters, as well as random access memory (RAM) that temporarily stores information such as parameters that change as appropriate. A specific functional configuration of the control section 100 will be described later with reference to FIG. 4.

The input section 101 includes a function of inputting spatial information. For example, the input section 101 is realized by a camera 1011, a microphone (hereinafter designated the mic) 1012, and a line-of-sight sensor 1013. The camera 1011 is provided on the periphery of a display 1031, for example, captures an image in the forward direction of the display 1031, and acquires a captured image (also designated "video" in this specification). The mic 1012 is provided on the periphery of the display 1031, for example, and acquires nearby sound. Note that the mic 1012 may also be a mic array that includes multiple microphones. In addition, the mic 1012 may also be provided near the user.

The line-of-sight sensor 1013 is provided on the periphery of the display 1031, for example, and tracks the line of sight of the user looking at the display 1031 (also known as a line-of-sight tracker). For example, the line-of-sight sensor 1013 detects the line of sight with respect to the display 1031 from the direction of the user's head and face, the eyeballs, and the position of the pupils. Also, for example, the line-of-sight sensor 1013 includes multiple infrared LEDs, and is capable of radiating infrared rays towards the user's eyeballs, and on the basis of the positional relationship between the position of the reflection point (light point) on the eyeballs and the pupil center points, computing the line-of-sight direction of the user. Note that the line-of-sight sensor 1013 is not limited to a device provided on the periphery of the display 1031. For example, it is also possible to provide a sensor in a see-through eyeglasses-style apparatus worn by the user, and on the basis of changes in the positions of the user's eyeballs (specifically, the blacks of the eyes (including the iris portion and the pupil portion) or the like) measured from an up-close distance, detect the motion of a gaze point on the display (which may also be a display of the see-through eyeglasses-style apparatus) seen from that point of view. Additionally, it is also possible to provide a sensor in a head-mounted apparatus worn by the user, and on the basis of changes in the positions of the eyeballs measured similarly from an up-close distance, detect the motion of the gaze point on a display inside the head-mounted apparatus.

The operation I/F 102 receives operation input from the user, and outputs to the control section 100. The operation I/F 102 may be realized by a keyboard, a mouse, a touch panel, buttons, switches, or the like. For example, the operation I/F 102 may be used to specify content to share with the partner user, perform operations on displayed content, and the like.

The output section 103 includes a function of presenting various information output from the control section 100 to the user. For example, the output section 103 includes the display 1031, a speaker 1032, and an indicator 1033. The display 1031 displays video of the partner user (remote space) and shared content. The speaker 1032 plays back audio of the partner user (remote space). Also, the indicator 1033 is realized by LED illumination used as signaling, for example. For example, the indicator 1033 is provided on the outer frame of the display 1031, and lights up in the case of notifying the user of something.

The communication section 104 connects to another information processing apparatus 10 through the network 20, and transmits or receives data. For example, the communication section 104 transmits a captured image captured by the camera 1011, audio data collected by the mic 1012, and shared content data (such as reference materials for a conference) to the information processing apparatus 10 of a communication destination. Also, the communication section 104 receives video, audio data, content data, and the like from the information processing apparatus 10 of the communication destination.

The storage section 105 stores programs and parameters by which the control section 100 executes each function. Additionally, the storage section 105 according to the present embodiment may also store data transmitted or received via the communication section 104.

Figure 4:
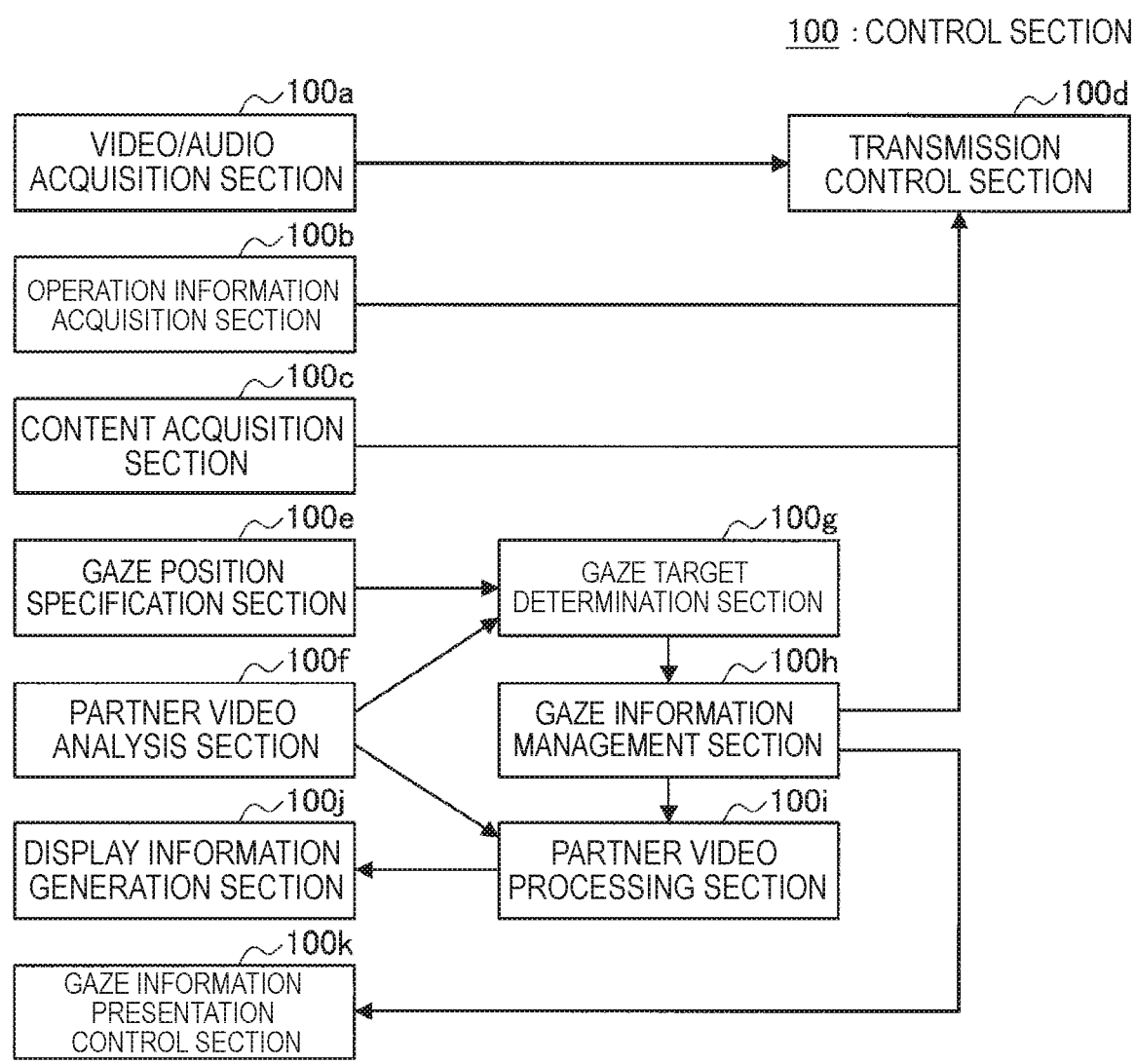
FIG. 4 is a block diagram illustrating an example of a functional configuration of a control section in the information processing apparatus illustrated in FIG. 3.

Next, FIG. 4 will be referenced to describe a specific functional configuration of the control section 100. FIG. 4 is a block diagram illustrating an example of a functional configuration of the control section 100 according to the present embodiment.

As illustrated in FIG. 4, the control section 100 functions as a video/audio acquisition section 100a, an operation information acquisition section 100b, a content acquisition section 100c, a transmission control section 100d, a gaze position specification section 100e, a partner video analysis section 100f, a gaze target determination section 100g, a gaze information management section 100h, a partner video processing section 100i, a display information generation section 100j, and a gaze information presentation control section 100k.

The video/audio acquisition section 100a acquires a captured image (video) captured by the camera 1011 and audio information collected by the mic 1012, and outputs to the transmission control section 100d. Note that the video/audio acquisition section 100a may also output to the transmission control section 100d after first performing various processing, such as noise processing and compression processing, on the acquired video and audio information.

The operation information acquisition section 100b acquires operation information input from the operation I/F 102, and outputs to the transmission control section 100d.

The content acquisition section 100c acquires content information to share in the information processing system 1, such as conference reference materials, and outputs to the transmission control section 100d.

The transmission control section 100d controls the transmission of video, audio data, operation information, content information, and the like to the information processing apparatus 10 of the communication destination from the communication section 104 through the network 20.

The gaze position specification section 100e specifies a gaze position on the display (for example, coordinate information corresponding to the display screen), on the basis of the user's gaze detected by the line-of-sight sensor 1013.

The partner video analysis section 100f analyzes (image analysis, object recognition) video received from the information processing apparatus 10 of the communication destination via the communication section 104. For example, the partner video analysis section 100f performs face recognition on a person (partner user) appearing in the video, and recognizes a region around the eyes.

Figure 5:
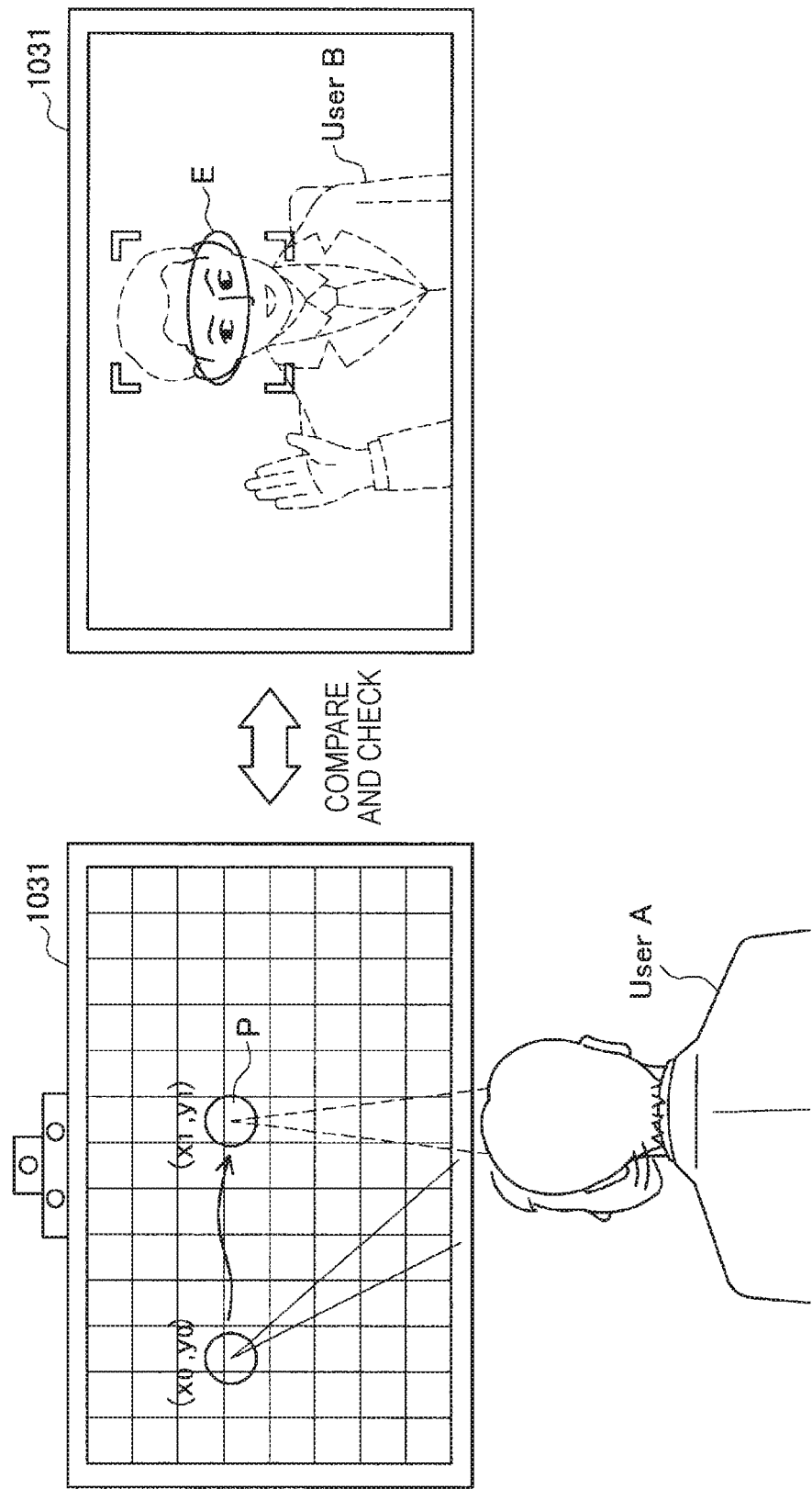
FIG. 5 is a diagram explaining a determination of a gaze target according to the present embodiment.

The gaze target determination section 100g determines a gaze target of the user in the video display on the display 1031. For example, as illustrated in FIG. 5, the gaze target determination section 100g compares and checks a gaze point P (specified by the gaze position specification section 100e) of the line of sight of the user A with respect to the display 1031 to a region E (recognized by the partner video analysis section 1000 around the eyes of the user B appearing in the video displayed on the display 1031, and determines the gaze target of the user A. In the example illustrated in FIG. 5, whether or not the user A is looking at the user B may be determined. Note that in the case in which content, such as conference reference materials, is being displayed on the display 1031, the gaze target determination section 100g determines which portion of the content the user A is gazing at.

The gaze information management section 100h manages the determination result by the gaze target determination section 100g as gaze information (management of line-of-sight status). The content of the determination result by the gaze target determination section 100g may be, for example, "the user A is looking at the user B", "the user A is looking at coordinates (x, y) of a materials image", or "the user A is not looking at the user B". Also, the gaze information management section 100h stores gaze information about the user A in the storage section 105. Also, the gaze information management section 100h outputs gaze information about the user A to the transmission control section 100d, and synchronizes gaze information with the information processing apparatus 10 of the communication destination by the transmission control section 100*d*. Specifically, the transmission control section 100*d* transmits gaze information about the user A to the information processing apparatus 10 of the communication destination from the communication section 104 through the network. Note that the synchronization of user gaze information is performed in each of the information processing apparatus 10 with each other, and the gaze information management section 100*h* also manages gaze information about the partner user transmitted from the information processing apparatus 10 of the communication destination. With this arrangement, the gaze information management section 100*h* is able to grasp whether or not the partner user B is looking at the user A, for example. Furthermore, the gaze information management section 100*h* is able to determine whether or not the lines of sight of both users are aligned, on the basis of the gaze information about the user A and the user B.

The partner video processing section 100*i* executes predetermined image processing on the partner video, on the basis of the gaze information managed by the gaze information management section 100*h*. For example, in the case in which the gaze information indicates that the partner user is gazing at the user, the partner video processing section 100*i* executes image processing such that the line of sight of the partner user appearing the partner video appears to point towards the user. As described above, because misalignments in the camera position and the like cause the line of sight to become misaligned even though the partner user is looking at the user appearing on the display, in the case in which the gaze information indicates that the partner user's line of sight is pointing towards the user, the line of sight of the partner user appearing in the partner video is processed to appear to point towards the user. Specifically, for example, the positions of the blacks of the eyes, the positions of both eyes, the direction of the head (face), and the like of the partner user appearing in the partner video are processed optimally. The processing method is not particularly limited, but methods that use 2D images, 2D images based on a 3D model, a 3D model image, or the like are possible, for example. 3D model data of the partner user is generated and transmitted in the information processing apparatus 10 on the partner's side, for example. For example, in the case of using a 3D model image to process the direction of the partner user's head, the partner video processing section 100*i* acquires data of a face model of the partner user in real-time obtained from an RGB-D camera (a camera equipped with a distance sensor) provided in the information processing apparatus 10 on the partner's side. Next, the partner video processing section 100*i* is able to apply color after first rotating the face model in a predetermined direction (for example, forward), combine compositing base images (face parts of the partner user appearing in the partner video) and optimize seams, and generate images in which the direction of the partner user's face is altered in real-time.

In addition, by reciprocally performing such a line-of-sight processing process, natural communication in which the lines of sight of the user and the partner user are aligned can be achieved.

Also, in the case in which the partner user's line of sight is pointing towards the camera, if the captured partner video is displayed as-is on the display, the partner user's line of sight will appear to be pointing at oneself, and thus it is also possible for the partner video processing section 100*i* to execute processing to make the partner user's line of sight look away.

Additionally, the partner video processing section 100*i* may optimize a display system in coordination with a communication state. For example, a communication path between users whose lines of sight are aligned with each other on the basis of the gaze information may be determined to be a high priority, and coordinated display control such as enlarging each other's video regions, increasing the image quality, or highlighting the display may be executed. On the other hand, the video of a partner user of low priority, for whom the lines of sight of the partner side and the user are not looking at each other, may be displayed at low resolution or the like.

The display information generation section 100*j* generates information to display on the display 1031. For example, the display information generation section 100*j* generates a screen in which line-of-sight processed partner video generated by the partner video processing section 100*i* and shared content information is arranged. Also, in the case in which line-of-sight processing by the partner video processing section 100*i* is unnecessary, the display information generation section 100*j* may also generate a screen in which unmodified partner video is arranged.

The gaze information presentation control section 100*k* presents gaze information to the user on the basis of the gaze information managed by the gaze information management section 100*h*. For example, in the case in which the partner user in the video displayed on the display 1031 is looking at the user, an indication of this is displayed on the display 1031, or the indicator 1033 is made to light up.

The above specifically describes the functional configuration of the control section 100 according to the present embodiment. Note that the control section 100 according to the present embodiment is not limited to the optimization of a display system corresponding to line-of-sight alignment, and is also capable of optimizing a sound system in coordination with a communication state, for example. Specifically, by making speech clear with a loud volume between users prioritized according to line-of-sight alignment, the control section 100 makes it easier to hear the voice of a partner being gazed at. On the other hand, the voice of a partner of low priority may be made unclear with a quiet volume. With this arrangement, even smoother communication can be encouraged.

3. Operating Processes

Figure 6:
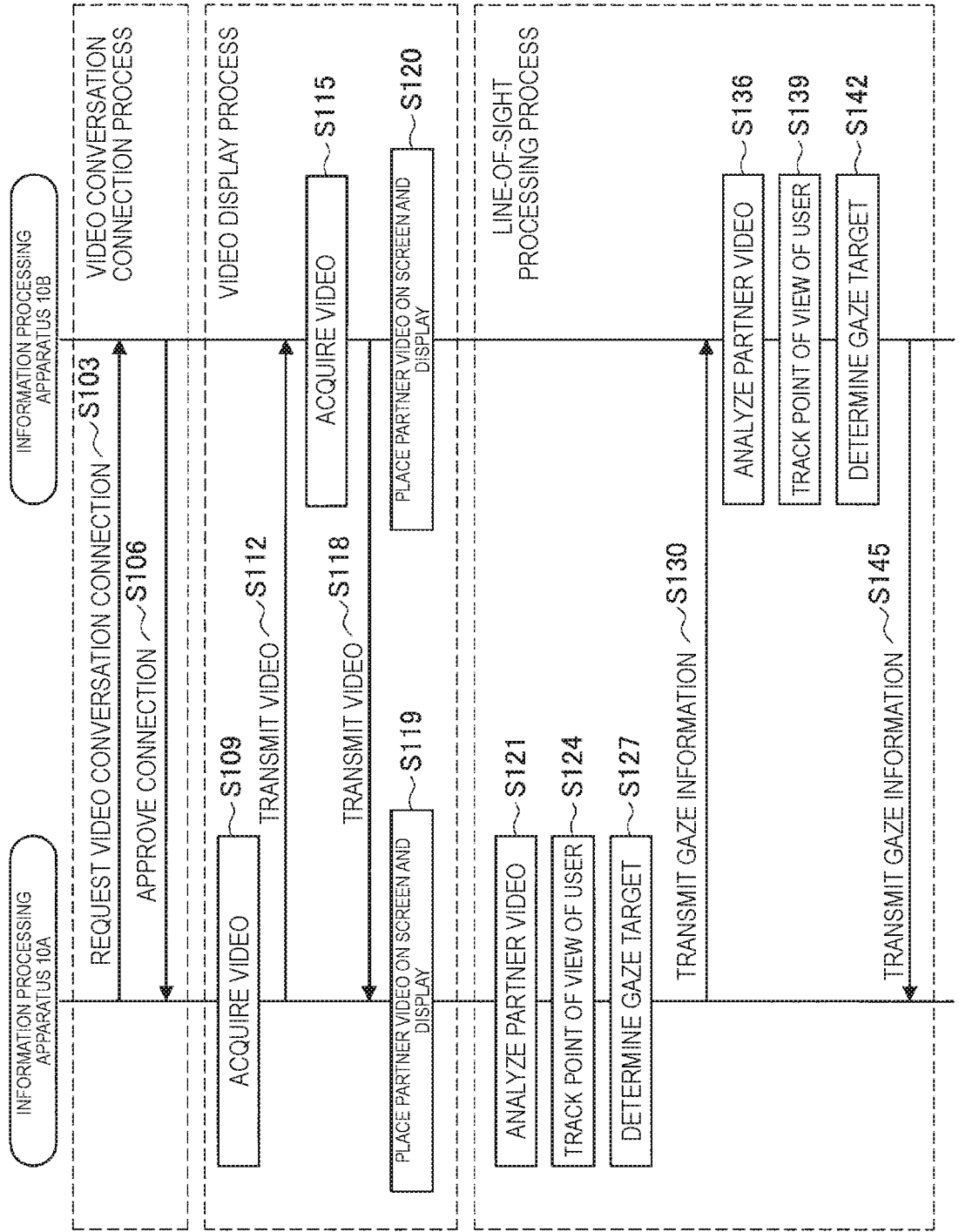
FIG. 6 is a sequence diagram illustrating operating processes according to the present embodiment.

Next, operating processes according to the present embodiment will be described with reference to FIG. 6. FIG. 6 is a sequence diagram illustrating operating processes according to the present embodiment. Herein, video communication of the user A and the user B executed between the information processing apparatus 10A and 10B will be described as an example.

As illustrated in FIG. 6, first, the information processing apparatus 10A issues a video conversation connection request to the information processing apparatus 10B (step S103), obtains a connection approval from the information processing apparatus 10B (step S106), and communication between both parties is established (video conversation connection process). Note that herein, the connection request is issued from the information processing apparatus 10A, but obviously is not limited thereto, and the connection request may also be issued from the information processing apparatus 10B to the information processing apparatus 10A.

Next, the information processing apparatus 10A acquires video capturing the user A present in front of the display 1031 (step S109), and transmits the video to the communication destination, that is, the information processing apparatus 10B (step S112). On the other hand, the information processing apparatus 10B similarly acquires video of the user B (step S115), and transmits the video to the information processing apparatus 10A (step S118).

Next, each information processing apparatus 10 arranges and displays the transmitted partner video on the screen (steps S119, S120). Such a video display process (steps S109 to S120) may be executed continually, and video communication between the user A and the user B may be performed in real-time. Note that herein, only "video" is illustrated, but audio data may also be transmitted/received and output together.

Next, the information processing apparatus 10A analyzes the partner video transmitted from the information processing apparatus 10B with the partner video analysis section 100f (step S121). Specifically, the information processing apparatus 10A executes image analysis, object recognition, and the like on the partner video, and recognizes the region around the eyes of the user B appearing in the partner video.

Next, the information processing apparatus 10A tracks the point of view (gaze point) of the user A on the display 1031 with the line-of-sight sensor 1013 (step S124). On the display 1031, the partner video transmitted from the information processing apparatus 10B is being displayed in real-time.

Next, the information processing apparatus 10A compares and checks the tracked point-of-view position of the user A to the region around the eyes of the user B appearing in the partner video, and determines whether or not the user A is gazing at the user B with the gaze target determination section 100g (step S127). Herein, a determination of whether or not the user A is looking at the user B (partner user) as a gaze target is described, but in the case in which content data such as conference reference materials is also arranged and displayed on the display 1031, the gaze target determination section 100g may also determine which part of the conference reference materials the user A is gazing at.

Next, the information processing apparatus 10A transmits gaze information to the information processing apparatus 10B (step S130).

This kind of gaze information synchronization process is also executed similarly in the information processing apparatus 10B (steps S136 to S145).

Figure 7:
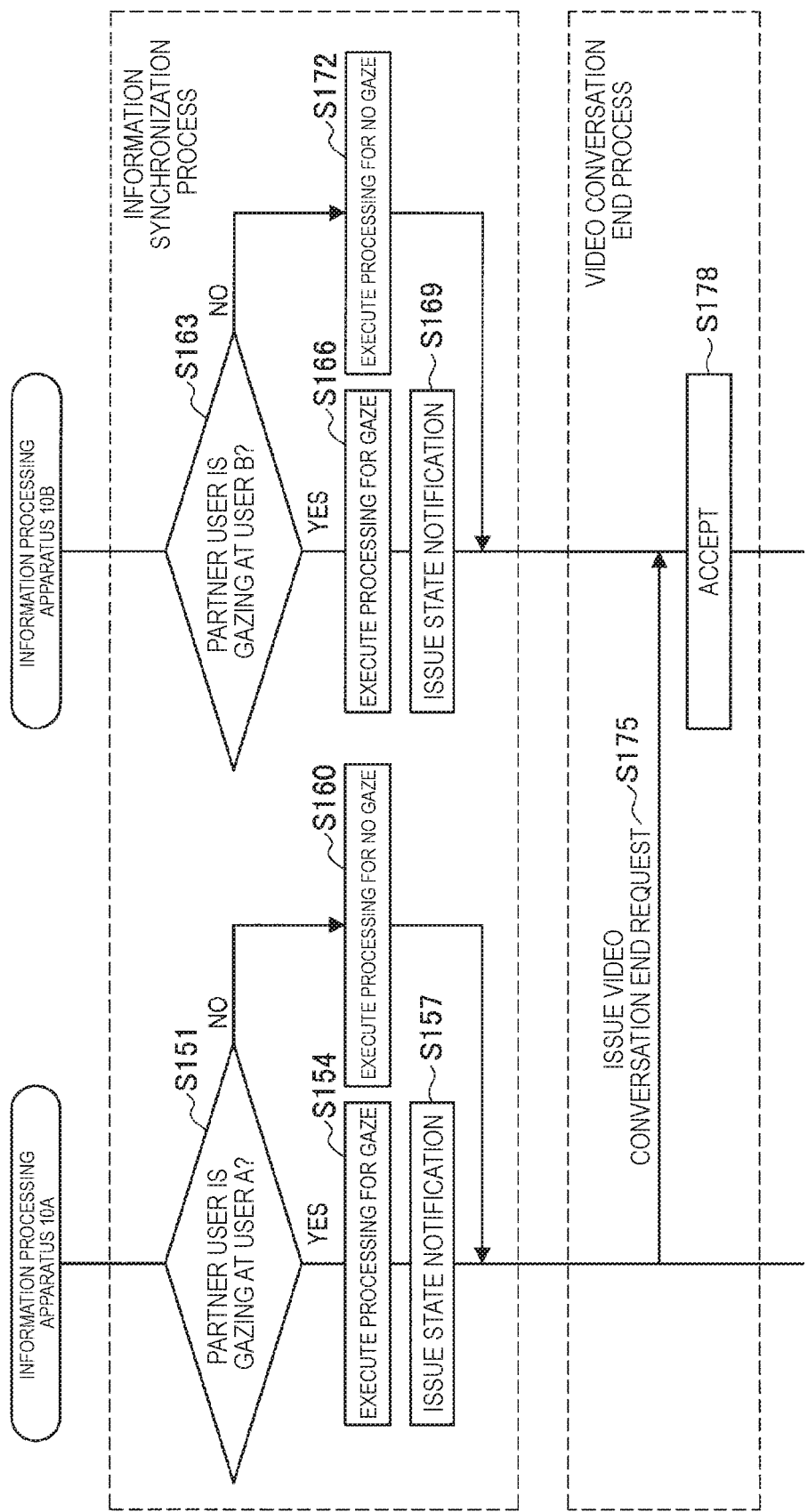
FIG. 7 is a sequence diagram illustrating operating processes that follow the operating processes illustrated in FIG. 6.

Next, FIG. 7 will be referenced to describe the continuation of the operating processes illustrated in FIG. 6. FIG. 7 is a sequence diagram illustrating operating processes that follow the operating processes illustrated in FIG. 6.

As illustrated in FIG. 7, next, the information processing apparatus 10A determines whether or not the partner user (user B) is gazing at the user A, on the basis of the gaze information transmitted from the information processing apparatus 10B (step S151).

In the case of gazing (step S151/Yes), the partner video processing section 100i executes processing for gaze (step S154). For example, in the case in which the line of sight of the user B appearing in the partner video is misaligned as illustrated in FIG. 2, the partner video processing section 100i is able to execute processing by performing image processing on the positions of the blacks of the eyes, the positions of both eyes, and the direction of the head (face) of the user B to point forward, thereby executing processing such that the line of sight of the user B appears to be pointing towards the user A facing the display. Additionally, the partner video processing section 100i may also execute a process that overlays a notification display such as "looking at user A" onto the partner video.

Next, the gaze information presentation control section 100k may notify the user A of the gaze state by causing the indicator to blink or the like (step S157).

On the other hand, in the case of not gazing (step S151/No), the partner video processing section 100i executes processing for no gaze (step S160). For example, the partner video processing section 100i is able to execute processing by performing image processing on the positions of the blacks of the eyes, the positions of both eyes, and the direction of the head (face) of the user B appearing in the partner video to point away from forward, thereby making it clear that the line of sight of the user B is not pointing towards the user A facing the display. Note that the partner video processing section 100i may also not execute any kind of processing in the case of no gaze.

This kind of line-of-sight processing process is also executed similarly in the information processing apparatus 10B (steps S163 to S172).

By performing the line-of-sight processing process described above in both of the information processing apparatus 10A and the information processing apparatus 10B, the lines of sight of the user A and the user B can be aligned with each other in video communication that connects remote locations, and smooth communication can be achieved.

Subsequently, if the information processing apparatus 10A issues a video conversation end request to the information processing apparatus 10B (step S175), and the request is accepted by the information processing apparatus 10B, the video conversation ends (step S178). Note that herein, the end request is issued from the information processing apparatus 10A, but obviously is not limited thereto, and the end request may also be issued from the information processing apparatus 10B to the information processing apparatus 10A.

4. Another Embodiment

In the embodiment described above, video communication between the two parties of the information processing apparatus 10A and the information processing apparatus 10B is described as an example, but even in video communication among three parties or more, by similarly executing the processes of gaze information synchronization and line-of-sight processing, it is possible to achieve smooth communication. Hereinafter, an embodiment in which gaze information about each user is synchronized by a processing server 30 will be described specifically with reference to FIGS. 8 to 15.

<4-1. Overview>

Figure 8:
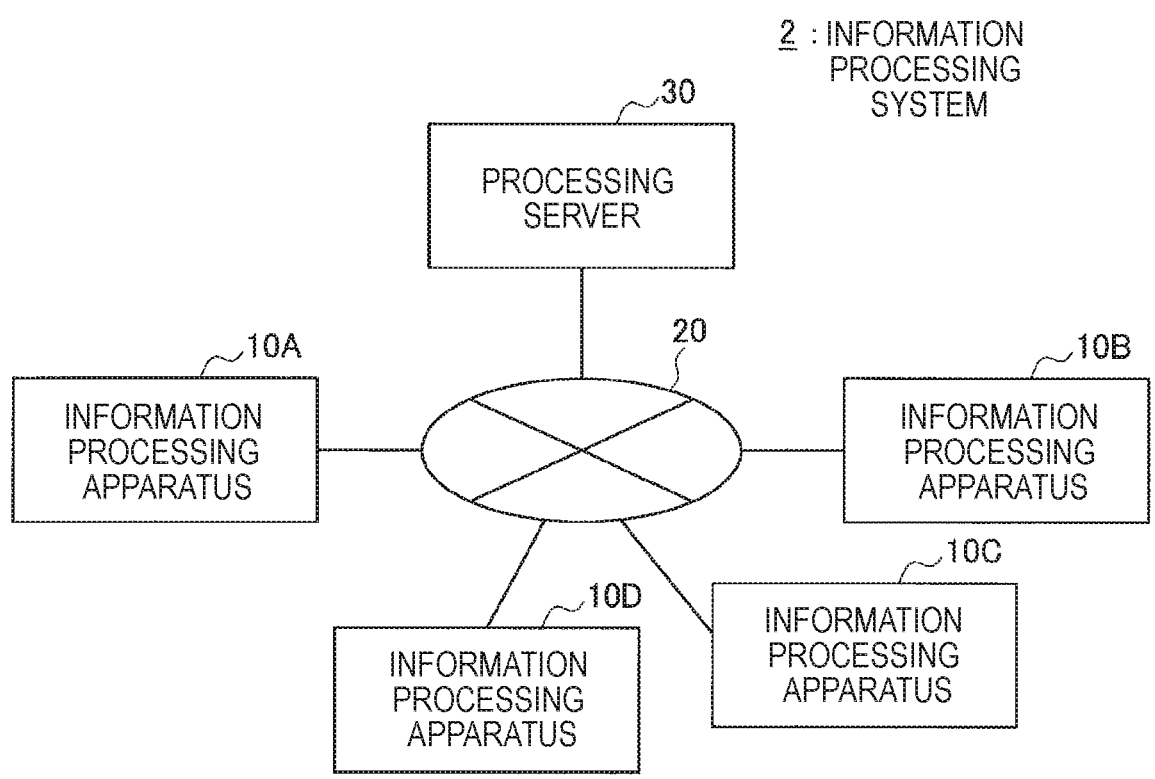
FIG. 8 is a diagram summarizing an information processing system according to another embodiment of the present disclosure.

FIG. 8 is a diagram summarizing an information processing system 2 according to another embodiment of the present disclosure. As illustrated in FIG. 8, the information processing system 2 according to another embodiment includes information processing apparatus 10A, 10B, 10C, 10D, and the processing server 30. The information processing apparatus 10A, 10B, 10C, 10D and the processing server 30 are interconnected through the network 20, and are capable of transmitting and receiving data. Note that herein, although four information processing apparatus 10 are used as an example, the present embodiment is not limited thereto, and in some cases gaze information about each user is synchronized by the processing server 30 in video communication between two parties, while in other cases, gaze information about each user is synchronized by the processing server 30 in video communication among three or more users.

Since the configuration of the information processing apparatus 10A to 10D is similar to the above embodiment described in FIGS. 3 and 4, details will be omitted here.

The processing server 30, by transmitting gaze information received from one information processing apparatus 10 to other information processing apparatus 10, synchronizes the gaze information of each information processing apparatus 10 within the system.

Specific operating processes of this kind of information processing system 2 according to the present embodiment will be described below with reference to FIG. 9.

<4-2. Operating Processes>

Figure 9:
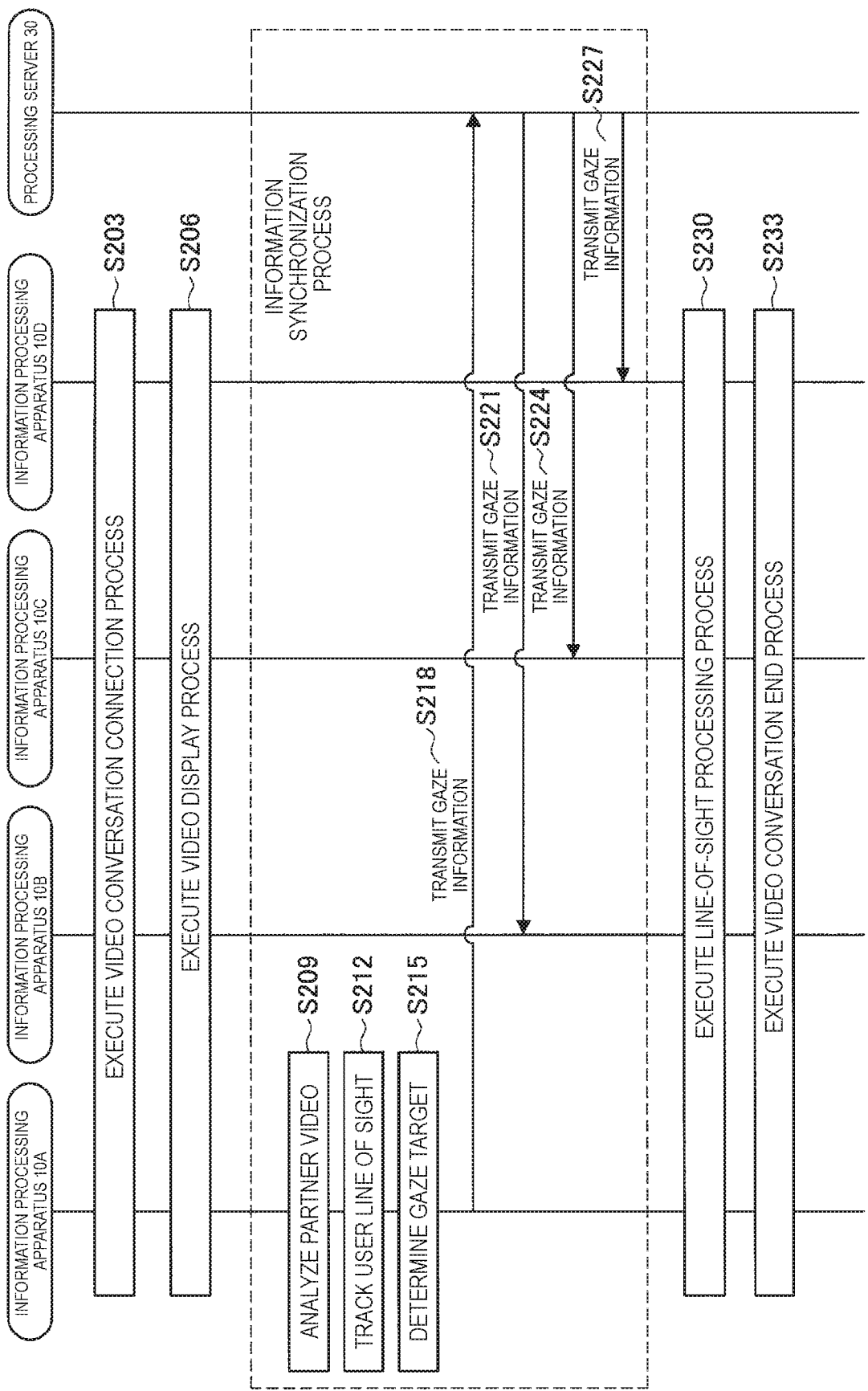
FIG. 9 is a sequence diagram illustrating operating processes according to another embodiment of the present disclosure.
Figure 10:
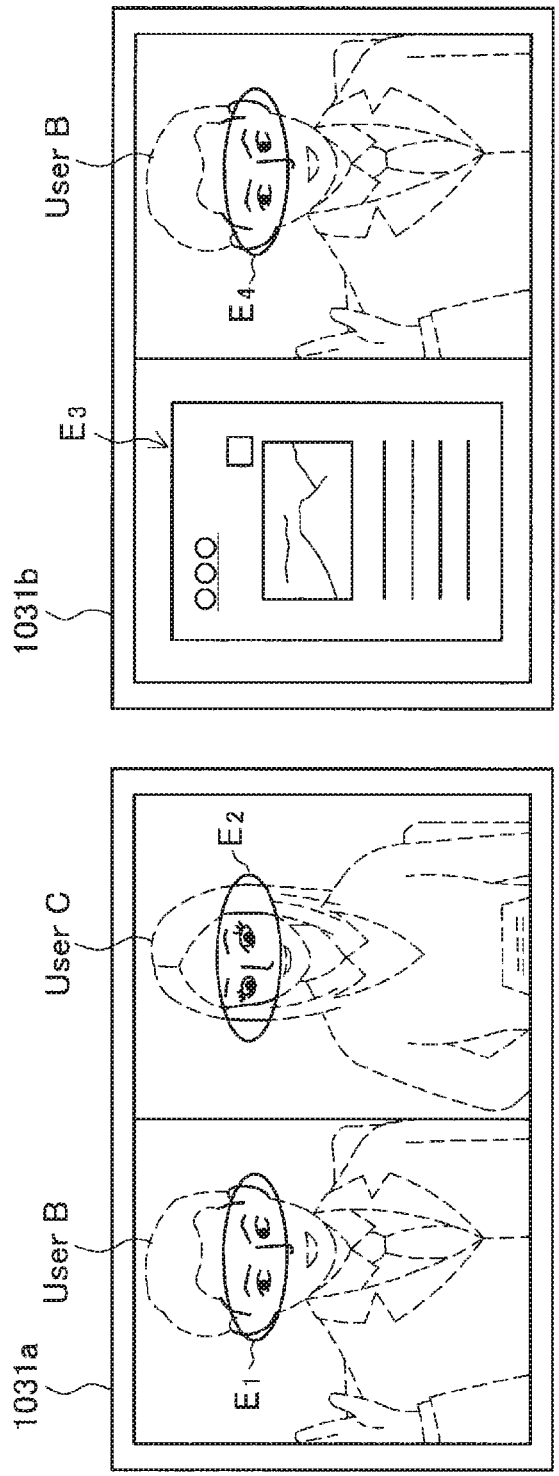
FIG. 10 is a diagram explaining a determination of a gaze target according to another embodiment of the present disclosure.

FIG. 9 is a sequence diagram illustrating operating processes according to another embodiment of the present disclosure. As illustrated in FIG. 9, first, a video conversation connection process is executed among the information processing apparatus 10A to 10D (step S203). In the video conversation connection process, similarly to steps S103 to S106 of FIG. 6, one information processing apparatus 10 issues a video conversation connection request to the other information processing apparatus 10, and approval by the other information processing apparatus 10 causes a connection to be established.

Next, a video display process is executed among the information processing apparatus 10A to 10D (step S206). In the video display process, similarly to steps S109 to S120 in FIG. 6, video of a user acquired by each information processing apparatus 10 is transmitted to the other information processing apparatus 10, and in each information processing apparatus 10, video of the partner users acquired by the other information processing apparatus 10 of the communication destination is displayed.

Next, a process of synchronizing gaze information among the information processing apparatus 10A to 10D is executed by the processing server 30. Specifically, for example, the information processing apparatus 10A analyzes partner video (step S209), additionally tracks the point of view of the user A (step S212), compares and checks the region around the eyes of a partner user recognized by video analysis to the point-of-view position of the user A, and determines the gaze target of the user A (step S215). Herein, FIG. 10 will be referenced to describe the determination of the gaze target. For example, as illustrated on the left side of FIG. 10, in the case in which videos of communication partners, namely the user B and a user C, are arranged on the screen of the display 1031a, the information processing apparatus 10A recognizes regions E1 and E1 around the eyes in each video, compares and checks against the point-of-view position of the user A, and determines whether the user A is gazing at the user B, gazing at the user C, or not looking at either one. Also, for example, as illustrated on the right side of FIG. 10, in the case in which a materials image which is shared content and a video of the user B who is a communication partner are arranged side-by-side on the screen of the display 1031b, the information processing apparatus 10A recognizes a materials image E3 and a region E4 around the eyes of the user B, compares and checks against the point-of-view position of the user A, and determines whether the user A is gazing at the materials image, gazing at the user B, or not looking at either one.

Next, the information processing apparatus 10A transmits the determination result, that is, gaze information to the processing server 30 (step S218).

Figure 11:
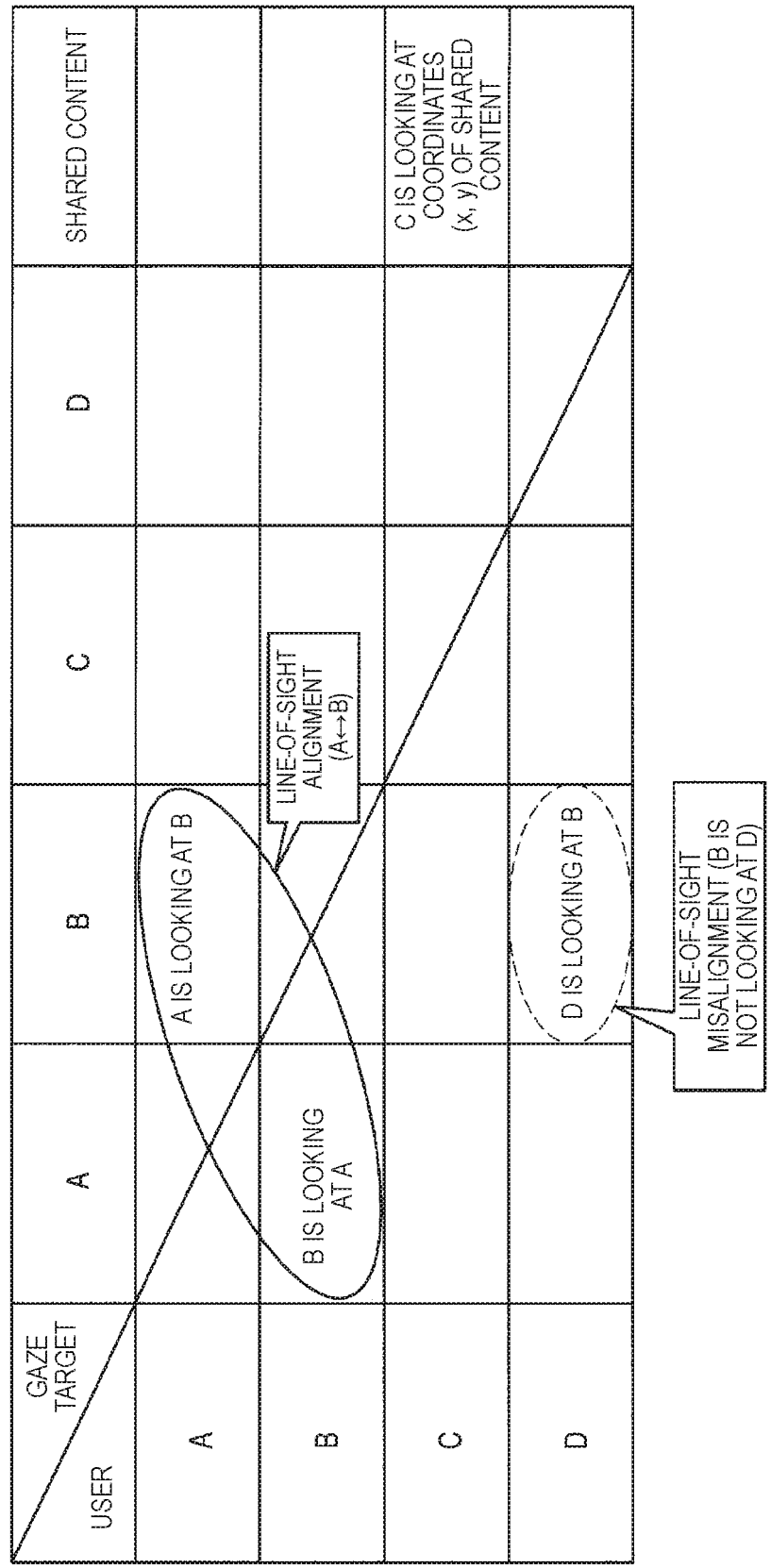
FIG. 11 is a diagram explaining an example of the management of line-of-sight status according to another embodiment of the present disclosure.

Next, the processing server 30 transmits the gaze information transmitted from the information processing apparatus 10A to the other information processing apparatus 10, herein the information processing apparatus 10B, the information processing apparatus 10C, and the information processing apparatus 10D (step S221, step S224, and step S227). In this way, the processing server 30 executes the gaze information synchronization process. Note that although the case of transmitting gaze information transmitted from the information processing apparatus 10A to the other information processing apparatus 10 is described as an example herein, the processing server 30 similarly transmits gaze information transmitted from the information processing apparatus 10B, the information processing apparatus 10C, and the information processing apparatus 10D to the other information processing apparatus 10 to synchronize the gaze information within the system. These processes are executed in real-time, and each information processing apparatus 10 is able to recognize what the partner users are currently looking at (for example, whether or not the partner users are looking at a user appearing on the display). In addition, the processing server 30 is capable of managing a line-of-sight status on the basis of the gaze information transmitted from each information processing apparatus 10, and synchronizing the line-of-sight status included in the gaze information with each information processing apparatus 10. Herein, FIG. 11 illustrates a diagram explaining one example of line-of-sight status management. The example illustrated in FIG. 11 illustrates an example of line-of-sight status management in the case in which video communication is performed among the four parties of the user A, the user B, the user C, and the user D, for example, and content such as a materials image is shared additionally. In this case, on the screen of the display 1031 of each information processing apparatus 10, each video of the three communication partners and an image of the shared content are arranged. Next, for example, the processing server 30 acquires gaze information indicating that "user A is looking at user B" from the information processing apparatus 10A of the user A, and acquires gaze information indicating that "user B is looking at user A" from the information processing apparatus 10B of the user B. Also, gaze information indicating that "user C is looking at coordinates (x, y) of the shared content" is acquired from the information processing apparatus 10C of the user C, and gaze information indicating that "user D is looking at user B" is acquired from the information processing apparatus 10D of the user D. In this case, as illustrated in FIG. 11, when the gaze information acquired from each information processing apparatus 10 is combined, the processing server 30 is able to recognize a line-of-sight status in which the lines of sight of the user A and the user B are aligned, while the lines of sight of the user D and the user B are not aligned. The processing server 30 also synchronizes such line-of-sight status in addition to the gaze information with each information processing apparatus 10. For example, in addition to gaze information acquired from the other information processing apparatus 10, such as "user A is looking at user B", "user B is looking at user A", and "user D is looking at user B", the processing server 30 transmits line-of-sight status information such as "lines of sight aligned: user A and user B", "lines of sight misaligned: user D and user B" to the information processing apparatus 10C of the user C.

The above describes a case in which the management of line-of-sight status is performed by the processing server 30 as an example, but the present embodiment is not limited thereto, and it is also possible to perform the management of line-of-sight status in the gaze information management section 100h of each information processing apparatus 10.

Next, returning to FIG. 9, the information processing apparatus 10A to 10D execute the line-of-sight processing process (step S230). In the line-of-sight processing process, similarly to steps S151 to S172 of FIG. 7, in each information processing apparatus 10, processing for gaze or processing for no gaze is executed on the basis of the synchronized gaze information. Specific screen display examples in which line-of-sight processing has been performed will be described later with reference to FIGS. 12 to 15.

Subsequently, the information processing apparatus 10A to 10D execute the video conversation end process (step S233). In the video conversation end process, similarly to steps S172 to S178 of FIG. 7, one information processing apparatus 10 issues a video conversation end request to the other information processing apparatus 10, and approval by the other information processing apparatus 10 causes the connection to be severed.

<4-3. Screen Display Examples>

Specific screen display examples in which line-of-sight processing has been performed according to the other embodiment described above will be described with reference to FIGS. 12 to 15.

(Display Example 1)

Figure 12:
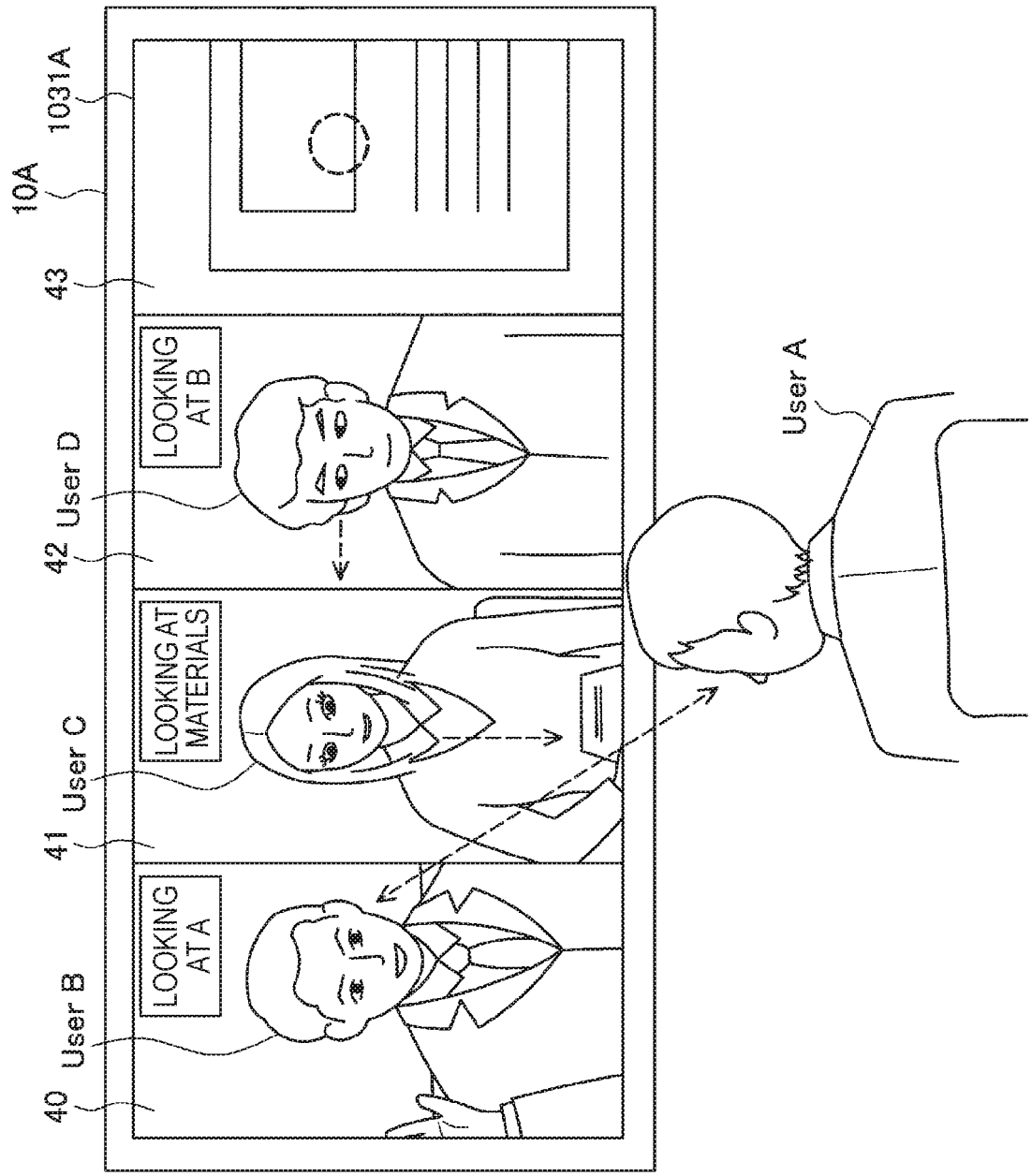
FIG. 12 is a diagram illustrating a screen display example in an information processing apparatus according to another embodiment of the present disclosure.

FIG. 12 is a diagram illustrating a screen display example in the information processing apparatus 10A according to the present embodiment. In the example illustrated in FIG. 12, a video 40 of the user B, a video 41 of the user C, a video 42 of the user D, and a materials image 43 which is shared content are arranged side-by-side and displayed on the screen of the display 1031A of the information processing apparatus 10A.

The information processing apparatus 10A processes the line of sight of the user B of the video 40, on the basis of gaze information indicating that "user B is looking at user A" in the video 40 of the user B. Specifically, as described above with reference to FIG. 2, since a misalignment in the camera position results in a video in which the line of sight is misaligned even though the user B is looking at the user A, the information processing apparatus 10A processes the positions of the blacks of the eyes, the positions of both eyes, or the direction of the head (face) of the user B in the video to point towards the front, and makes the line of sight of the user B of the video 40 appear to point towards to the user A as illustrated in FIG. 12. With this arrangement, the line of sight of the user A can be aligned with the user B, and smoother video communication can be performed. Furthermore, the information processing apparatus 10A may also overlay a notification display such as "looking at user A" onto the video 40.

In addition, on the basis of gaze information indicating that "user C is looking at coordinates (x, y) of the materials", the information processing apparatus 10A overlays a notification display such as "looking at materials" onto the video 41 in which the user C appears.

Also, on the basis of gaze information indicating that "user D is looking at user B", the information processing apparatus 10A processes the line of sight of the user D appearing in the video 42 to point in the direction where the video 40 in which the user B appears is arranged on the screen, as illustrated in FIG. 12.

Also, on the basis of gaze information indicating that "user C is looking at coordinates (x, y) of the materials", the information processing apparatus 10A overlays a display or an icon indicating the gaze position at the coordinates (x, y) on the materials image 43, thereby pointing out where the user C is looking in the materials.

(Display Example 2)

Figure 13:
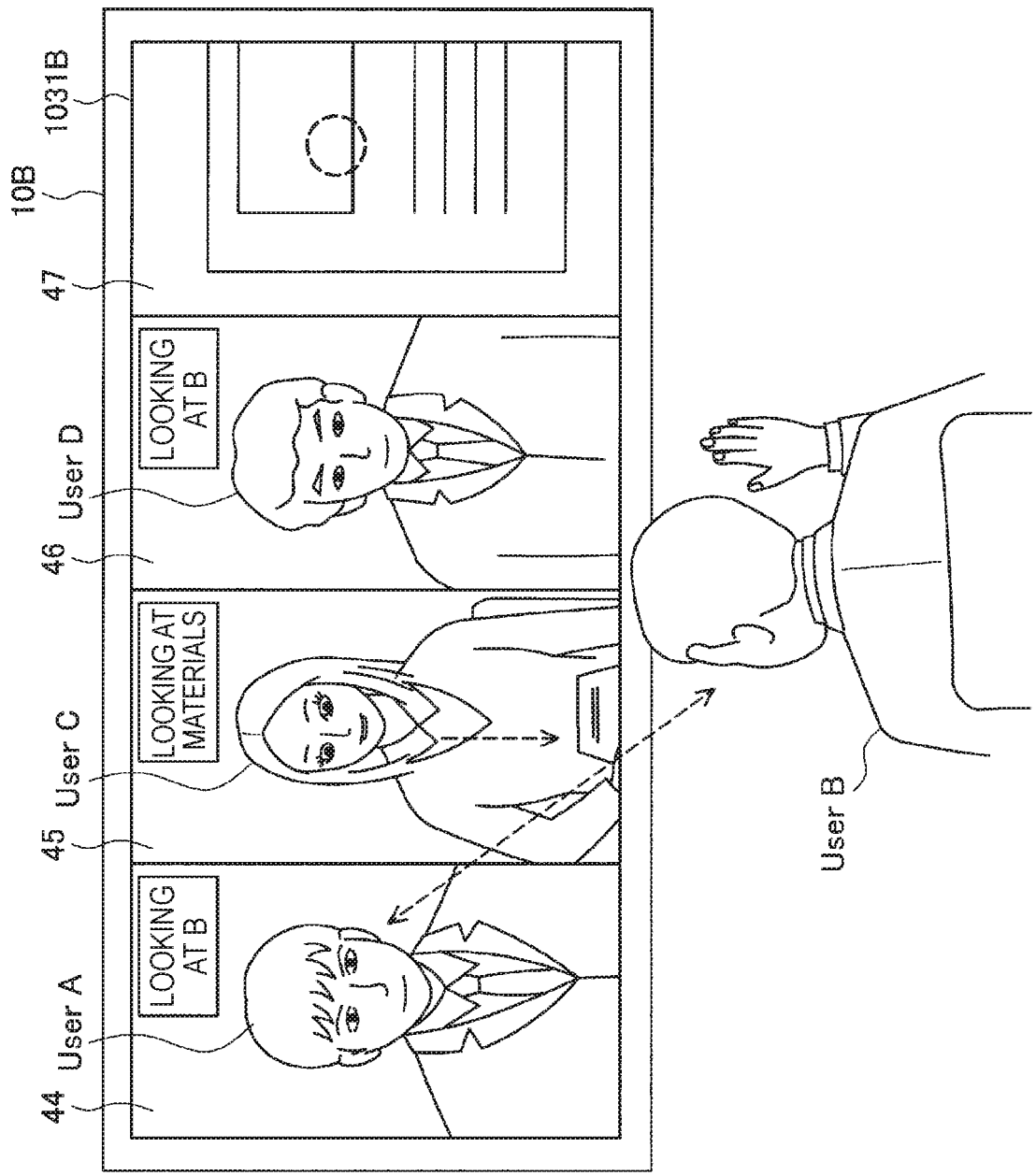
FIG. 13 is a diagram illustrating a screen display example in an information processing apparatus according to another embodiment of the present disclosure.

FIG. 13 is a diagram illustrating a screen display example in the information processing apparatus 10B according to the present embodiment. In the example illustrated in FIG. 13, a video 44 of the user A, a video 45 of the user C, a video 46 of the user D, and a materials image 47 which is shared content are arranged side-by-side and displayed on the screen of the display 1031B of the information processing apparatus 10B.

The information processing apparatus 10B processes the line of sight of the user A of the video 44, on the basis of gaze information indicating that "user A is looking at user B" in the video 44 of the user A. Specifically, similarly to the case described above with reference to FIG. 2, since a misalignment in the camera position results in a video in which the line of sight is misaligned even though the user A is looking at the user B, the information processing apparatus 10B processes the positions of the blacks of the eyes, the positions of both eyes, or the direction of the head (face) of the user A in the video to point towards the front, and makes the line of sight of the user A of the video 44 appear to point towards to the user B as illustrated in FIG. 13. With this arrangement, the line of sight of the user B can be aligned with the user A, and smoother video communication can be performed. Furthermore, the information processing apparatus 10B may also overlay a notification display such as "looking at user B" onto the video 44.

In addition, on the basis of gaze information indicating that "user C is looking at coordinates (x, y) of the materials", the information processing apparatus 10B overlays a notification display such as "looking at materials" onto the video 45 in which the user C appears.

Also, on the basis of gaze information indicating that "user D is looking at user B", the information processing apparatus 10B processes the positions of the blacks of the eyes, the positions of both eyes, or the direction of the head (face) of the user D appearing in the video 46, and makes the line of sight of the user D of the video 46 appear to point towards the user B as illustrated in FIG. 13.

Also, on the basis of gaze information indicating that "user C is looking at coordinates (x, y) of the materials", the information processing apparatus 10B overlays a display or an icon indicating the gaze position at the coordinates (x, y) on the materials image 47, thereby pointing out where the user C is looking in the materials.

(Display Example 3)

Figure 14:
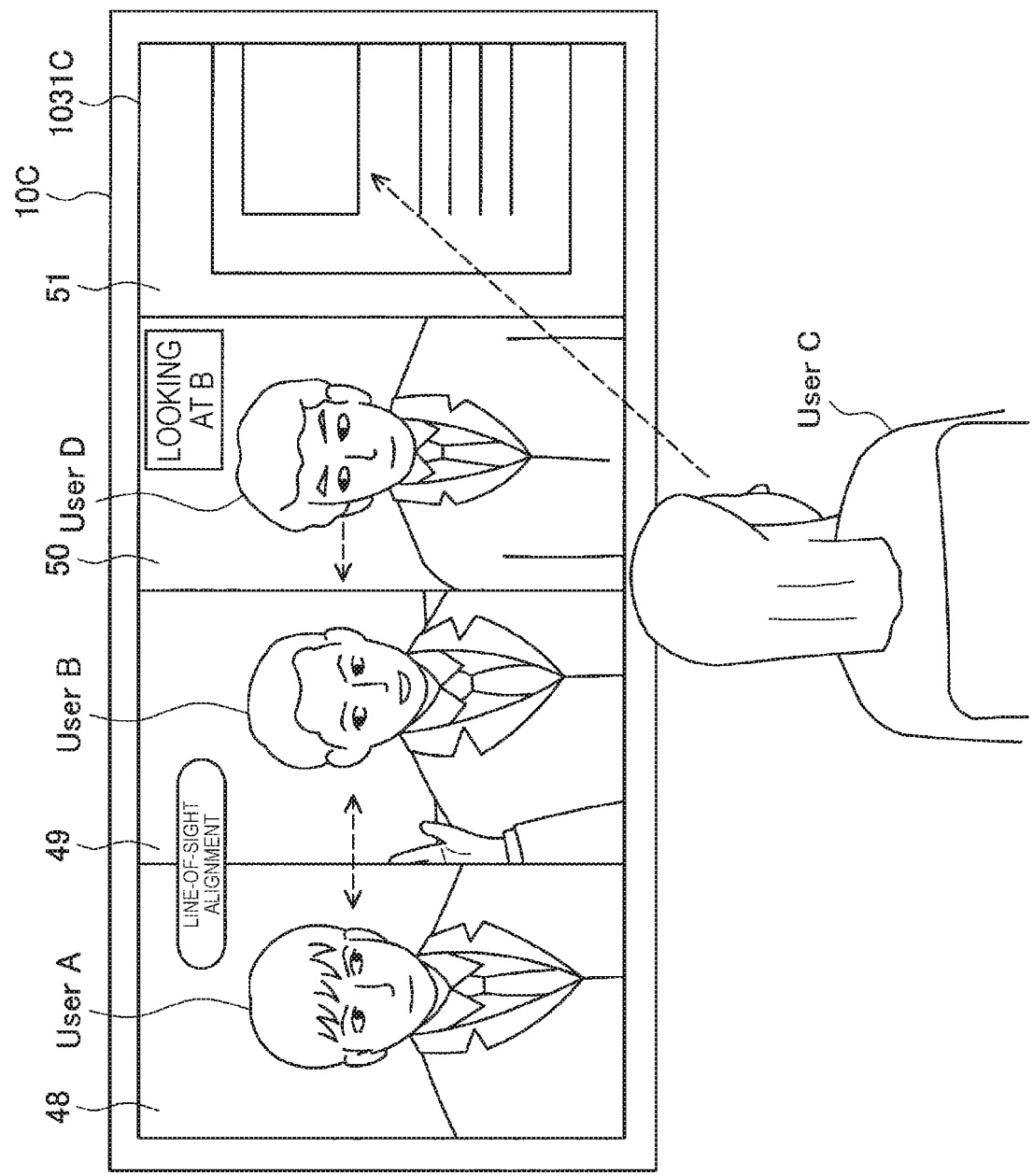
FIG. 14 is a diagram illustrating a screen display example in an information processing apparatus according to another embodiment of the present disclosure.

FIG. 14 is a diagram illustrating a screen display example in the information processing apparatus 10C according to the present embodiment. In the example illustrated in FIG. 14, a video 48 of the user A, a video 49 of the user B, a video 50 of the user D, and a materials image 51 which is shared content are arranged side-by-side and displayed on the screen of the display 1031C of the information processing apparatus 10C.

The information processing apparatus 10C processes the lines of sight of the user A of the video 48 and the user B of the video 49, on the basis of a line-of-sight status indicating "lines of sight aligned: user A and user B". Specifically, the information processing apparatus 10C processes the positions of the blacks of the eyes, the positions of both eyes, or the direction of the head (face) of the user A in the video 48 to point in the direction of the video 49 of the user B arranged on the right side, and additionally, processes the positions of the blacks of the eyes, the positions of both eyes, or the direction of the head (face) of the user B in the video 49 to point in the direction of the video 48 of the user A arranged on the left side. With this arrangement, as illustrated in FIG. 14, the lines of sight of the user A and the user B may be expressed as aligned on the screen. Furthermore, the information processing apparatus 10C may also overlay a notification display such as "lines of sight aligned" onto the video 48 and the video 49.

Also, on the basis of gaze information indicating that "user D is looking at user B", the information processing apparatus 10C processes the positions of the blacks of the eyes, the positions of both eyes, or the direction of the head (face) of the user D appearing in the video 50 to point in the direction in which the video 49 of the user B is arranged to the left on the screen, and makes the line of sight of the user D of the video 50 appear to point in the direction of the user B as illustrated in FIG. 14.

(Display Example 4)

Figure 15:
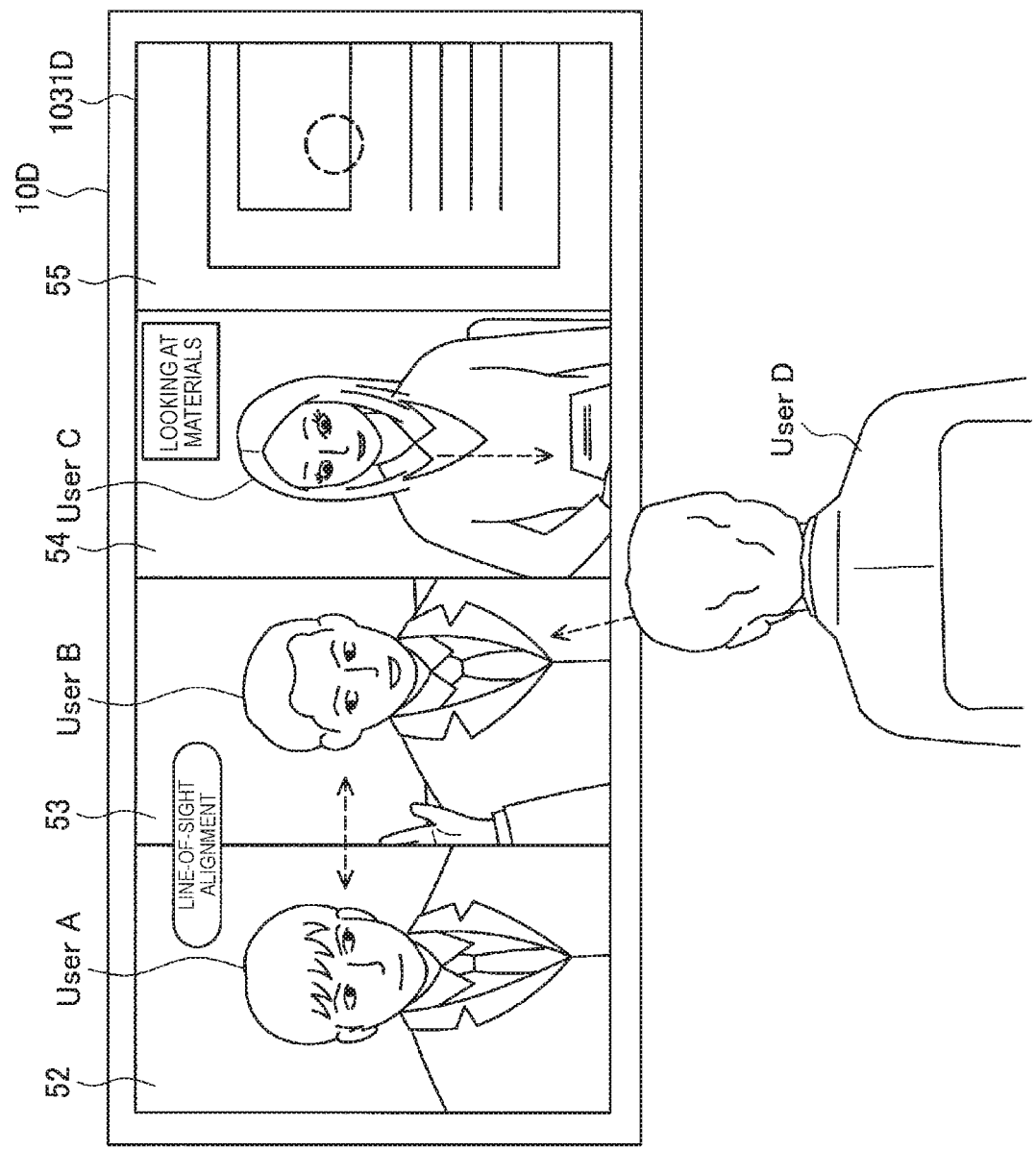
FIG. 15 is a diagram illustrating a screen display example in an information processing apparatus according to another embodiment of the present disclosure.

FIG. 15 is a diagram illustrating a screen display example in the information processing apparatus 10D according to the present embodiment. FIG. 15 is a diagram illustrating a screen display example in the information processing apparatus 10D according to the present embodiment. In the example illustrated in FIG. 15, a video 52 of the user A, a video 53 of the user B, a video 54 of the user C, and a materials image 55 which is shared content are arranged side-by-side and displayed on the screen of the display 1031C of the information processing apparatus 10D.

The information processing apparatus 10D processes the lines of sight of the user A of the video 52 and the user B of the video 53, on the basis of a line-of-sight status indicating "lines of sight aligned: user A and user B". Specifically, the information processing apparatus 10D processes the positions of the blacks of the eyes, the positions of both eyes, or the direction of the head (face) of the user A in the video 52 to point in the direction of the video 53 of the user B arranged on the right side, and additionally, processes the positions of the blacks of the eyes, the positions of both eyes, or the direction of the head (face) of the user B in the video 53 to point in the direction of the video 52 of the user A arranged on the left side. With this arrangement, as illustrated in FIG. 15, the lines of sight of the user A and the user B may be expressed as aligned on the screen. Furthermore, the information processing apparatus 10D may also overlay a notification display such as "lines of sight aligned" onto the video 52 and the video 53.

With this arrangement, the user D understands a state in which the user B at which one's own line of sight is pointed is looking not at oneself but at the user A, and additionally, the line of sight is aligned with the user A.

In addition, on the basis of gaze information indicating that "user C is looking at coordinates (x, y) of the materials", the information processing apparatus 10D overlays a notification display such as "looking at materials" onto the video 54 in which the user C appears.

Also, on the basis of gaze information indicating that "user C is looking at coordinates (x, y) of the materials", the information processing apparatus 10D overlays a display or an icon indicating the gaze position at the coordinates (x, y) on the materials image 55, thereby pointing out where the user C is looking in the materials.

5. Conclusion

As described above, an information processing system according to the present disclosure makes it possible to grasp a partner's line of sight more naturally in video communication that connects remote locations.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a central processing unit (CPU), read-only memory (ROM), and random access memory (RAM) built into the information processing apparatus 10 or the processing server 30 described above to exhibit the functions of the information processing apparatus 10 or the processing server 30. In addition, a computer-readable storage medium storing the computer program is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a receiving section that receives a captured image of a video communication partner from a communication destination apparatus; and a control section that controls a display of the received captured image on a display section, in which the control section executes image processing to display the captured image such that a line of sight of a communication partner appearing in the captured image appears to point towards a user looking at the display section, on a basis of information indicating that the communication partner appearing in the captured image is looking at the user being displayed on the communication destination apparatus.

(2)

The information processing apparatus according to (1), in which the control section processes a position of a pupil, positions of both eyes, or a direction of a head in a face image of the communication partner appearing in the captured image to point forward.

(3)

The information processing apparatus according to (1) or (2), further including:

a transmitting section that transmits a captured image capturing the user looking at the display section to the communication destination apparatus.

(4)

The information processing apparatus according to any one of (1) to (3), in which the control section detects a line of sight of the user with respect to the display section to compute a gaze position on a screen of the display section, compares the computed gaze position and a region around an eye of a communication partner being displayed on the display section, and determines whether or not the user is looking at the communication partner, and on a basis of the determination, controls a transmission of information indicating that the user is looking at the communication partner to the communication destination apparatus.

(5)

The information processing apparatus according to (4), in which the control section determines whether or not the communication partner and the user are in a state of looking at each other, and on a basis of the determination, controls a transmission of information indicating that the lines of sight of both persons are aligned to the communication destination apparatus.

(6)

The information processing apparatus according to (5), in which the receiving section receives a captured image of each video communication partner from a plurality of communication destination apparatuses, and the control section controls a display of the received captured images arranged on the display section, determines which communication partner displayed on the display section the user is looking at, and on a basis of the determination, controls a synchronization of information indicating which communication partner the user is looking at with the plurality of communication destination apparatuses.

(7)

The information processing apparatus according to (6), in which on a basis of information indicating that lines of sight of a plurality of communication partners displayed on the display section are aligned, the control section processes a position of a pupil, positions of both eyes, or a direction of a head of the plurality of communication partners such that the lines of sight of the plurality of communication partners appear to be in alignment.

(8)

The information processing apparatus according to any one of (4) to (7), in which the control section controls a display of a materials image on the display section, compares the computed gaze position of the user on the screen and the materials image displayed on the display section, and determines whether or not the user is looking at the materials image, and on a basis of the determination, controls a transmission of information indicating that the user is looking at the materials image to the communication destination apparatus.

(9)

The information processing apparatus according to (8), in which on a basis of information indicating that a communication partner displayed on the display section is looking at the materials image, the control section overlays a display clearly indicating a position that the communication partner is gazing at on the materials image arranged and displayed on the display section.

(10)

The information processing apparatus according to any one of (1) to (9), in which the control section processes the line of sight of the communication partner appearing in the captured image to point away from forward, on a basis of information indicating that the communication partner is not looking at the user.

(11)

The information processing apparatus according to any one of (1) to (10), including:

a communication section, in which the communication section receives, from a server, information indicating that the communication partner appearing in the captured image is looking at the user being displayed on the communication destination apparatus.

(12)

The information processing apparatus according to (11), in which the communication section transmits, to the server, information related to a line of sight of the user with respect to the display section.

(13)

An information processing method, executed by a processor, including:

receiving a captured image of a video communication partner from a communication destination apparatus;

controlling a display of the received captured image on a display section; and executing image processing to display the captured image such that a line of sight of a communication partner appearing in the captured image appears to point towards a user looking at the display section, on a basis of information indicating that the communication partner appearing in the captured image is looking at the user being displayed on the communication destination apparatus.

(14)

A program causing a computer to function as:

a receiving section that receives a captured image of a video communication partner from a communication destination apparatus; and a control section that controls a display of the received captured image on a display section, in which the control section executes image processing to display the captured image such that a line of sight of a communication partner appearing in the captured image appears to point towards a user looking at the display section, on a basis of information indicating that the communication partner appearing in the captured image is looking at the user being displayed on the communication destination apparatus.

REFERENCE SIGNS LIST 1, 2 information processing system
10 (10A to 10D) information processing apparatus
20 network
30 processing server
100 control section
100a video/audio acquisition section
100b operation information acquisition section
100c content acquisition section
100d transmission control section
100e gaze position specification section
100f partner video analysis section
100g gaze target determination section
100h gaze information management section
100i partner video processing section
100j display information generation section
100k gaze information presentation control section
101 input section
1011 camera
1012 mic
1013 line-of-sight sensor
102 operation I/F
103 output section 1031 display
1032 speaker
1033 indicator
104 communication section
105 storage section

The invention claimed is:

1. An information processing apparatus, comprising:
a receiving section configured to:
receive a captured image of a video communication partner from a communication destination apparatus; and
receive first information indicating a gaze of the video communication partner is at a user of the information processing apparatus, wherein the user is displayed on the communication destination apparatus; and
a control section configured to:
control a display screen to display the received captured image;
determine a line of sight of the video communication partner in the displayed captured image is misaligned with a line of sight of the user; and
execute an image process on the displayed captured image such that the line of sight of the video communication partner in the displayed captured image point towards the user, wherein
a gaze of the user is at the display screen, and
the execution of the image process is based on the first information and the determination that the line of sight of the video communication partner in the captured image is misaligned with the line of sight of the user.

2. The information processing apparatus according to claim 1, wherein the control section is further configured to process at least one of a position of a pupil, positions of both eyes, or a direction of a head in a face image of the video communication partner in the displayed captured image to point forward.

3. The information processing apparatus according to claim 1, further comprising a transmitting section configured to transmit a captured image of the user to the communication destination apparatus, wherein the transmitted captured image indicates that the gaze of the user is at the display screen.

4. The information processing apparatus according to claim 1, wherein
the control section is further configured to:
detect the line of sight of the user with respect to the display screen;
compute a gaze position of the user on the display screen based on the detected line of sight of the user;
compare the computed gaze position and a region around an eye of the video communication partner in the displayed captured image;
determine the gaze of the user is at the video communication partner; and
control transmission of second information, indicating that the gaze of user is at the video communication partner, to the communication destination apparatus based on the determination that the gaze of the user is at the video communication partner.

5. The information processing apparatus according to claim 4, wherein
the control section is further configured to:
determine the line of sight of the video communication partner is in alignment with the line of sight of the user; and
control transmission of third information, indicating that the line of sight of the user is in alignment with the line of sight of the video communication partner, to the communication destination apparatus,
wherein the transmission of the third information is based on the determination that the line of sight of the video communication partner is in alignment with the line of sight of the user.

6. The information processing apparatus according to claim 5, wherein
the receiving section is further configured to:
receive a plurality of captured images of a plurality of video communication partners from a plurality of communication destination apparatuses, wherein each of the plurality of captured images corresponds to a respective video communication partner of the plurality of video communication partners; and
the control section is further configured to:
control the display screen to display the plurality of captured images;
determine the gaze of the user is at a specific video communication partner of the plurality of video communication partners displayed on the display screen; and
control synchronization of fourth information, indicating the gaze of the user is at the specific video communication partner, between the plurality of communication destination apparatuses,
wherein the synchronization is based on the determination that the gaze of the user is at the specific video communication partner.

7. The information processing apparatus according to claim 6, wherein the control section is further configured to process at least one of a position of a pupil, positions of both eyes, or a direction of a head of each of a first video communication partner of the plurality of video communication partners and a second video communication partner of the plurality of video communication partners such that a line of sight of the first video communication partner is in alignment with a line of sight of the second video communication partner.

8. The information processing apparatus according to claim 4, wherein
the control section is further configured to:
control the display screen to display a materials image;
compare the computed gaze position of the user on the display screen and the materials image displayed on the display screen,
determine that the gaze of the user is at the materials image based on the comparison of the computed gaze position and the materials image; and
control transmission of third information, indicating that the gaze of the user is at the materials image, to the communication destination apparatus, wherein the transmission of the third information is based on the determination that the gaze of the user is at the materials image.

9. The information processing apparatus according to claim 8, wherein
the receiving section is further configured to receive fourth information indicating that the gaze of the video communication partner displayed on the display screen is at the materials image, and
the control section is further configured to control the display screen, to display a notification display, based on the fourth information, wherein the notification display indicates a position on the materials image, and the position on the displayed materials image corresponds to the gaze of the video communication partner.

10. The information processing apparatus according to claim 1, wherein the receiving section is further configured to receive second information indicating the gaze of the video communication partner is away from the user, and the control section is further configured to process the line of sight of the video communication partner, in the displayed captured image to point away from a forward direction, based on the second information.

11. The information processing apparatus according to claim 1, further comprising a communication section configured to receive the first information from a server.

12. The information processing apparatus according to claim 11, wherein the communication section is further configured to transmit, to the server, second information related to the line of sight of the user with respect to the display screen.

13. An information processing method, comprising:

receiving a captured image of a video communication partner from a communication destination apparatus;

receiving information indicating a gaze of the video communication partner is at a user, wherein the user is displayed on the communication destination apparatus;

controlling a display screen to display the received captured image;

determining a line of sight of the video communication partner in the captured image is misaligned with a line of sight of the user; and executing an image process on the displayed captured image such that the line of sight of the video communication partner in the displayed captured image point towards the user, wherein a gaze of the user is at the display screen, and the execution of the image process is based on the information and the determination that the line of sight of the video communication partner in the displayed captured image is misaligned with the line of sight of the user.

14. A non-transitory computer-readable medium having stored thereon, computer-executable instructions which, when executed by a processor of an information processing apparatus, cause the processor to execute operations, the operations comprising:

receiving a captured image of a video communication partner from a communication destination apparatus;

receiving information indicating a gaze of the video communication partner is at a user of the information processing apparatus, wherein the user is displayed on the communication destination apparatus;

controlling a display screen to display the received captured image;

determining a line of sight of the video communication partner in the captured image is misaligned with a line of sight of the user; and executing an image process on the displayed captured image such that the line of sight of the video communication partner in the displayed captured image point towards the user, wherein a gaze of the user is at the display screen, and the execution of the image process is based on the information and the determination that the line of sight of the video communication partner in the displayed captured image is misaligned with the line of sight of the user.

15. An information processing apparatus, comprising:

a receiving section configured to:

receive a captured image of a video communication partner from a communication destination apparatus; and receive information indicating that a gaze of the video communication partner is at a materials image; and a control section configured to:

control a display screen to:

display the received captured image;

display the materials image;

display a first notification display on the display of the received captured image based on the received information, wherein the first notification display indicates that the gaze of the video communication partner is at the materials image; and display a second notification display, on the display of the materials image, based on the received information, wherein the second notification display indicates a position on the displayed materials image, and the position on the displayed materials image corresponds to the gaze of the video communication partner.

* * * * *